(No Model.)

C. E. R. MARSH.
COOKING UTENSIL.

No. 535,216. Patented Mar. 5, 1895.

Witnesses:
K. J. Clemons
J. W. Garfield

Inventor,
Cynthia E. R. Marsh,
by Chapin & Co.
Attys.

UNITED STATES PATENT OFFICE.

CYNTHIA E. R. MARSH, OF SPRINGFIELD, MASSACHUSETTS.

COOKING UTENSIL.

SPECIFICATION forming part of Letters Patent No. 535,216, dated March 5, 1895.

Application filed December 19, 1894. Serial No. 532,286. (No model.)

*To all whom it may concern:*

Be it known that I, CYNTHIA E. R. MARSH, a citizen of the United States of America, residing at Springfield, in the county of Hampden and State of Massachusetts, have invented new and useful Improvements in Cooking Utensils, of which the following is a specification.

This invention relates to improvements in a culinary utensil which is available for receiving, draining, and subjecting to the action of the air, articles of food, such as nut-cakes, crullers, fritters, croquettes, and the like, which have been fried or cooked in heated or boiling fat.

The invention consists in a utensil comprising features and characteristics, all substantially as will hereinafter fully appear and be set forth in the claim.

Reference is to be had to the accompanying drawings, in which—

Figure 1:
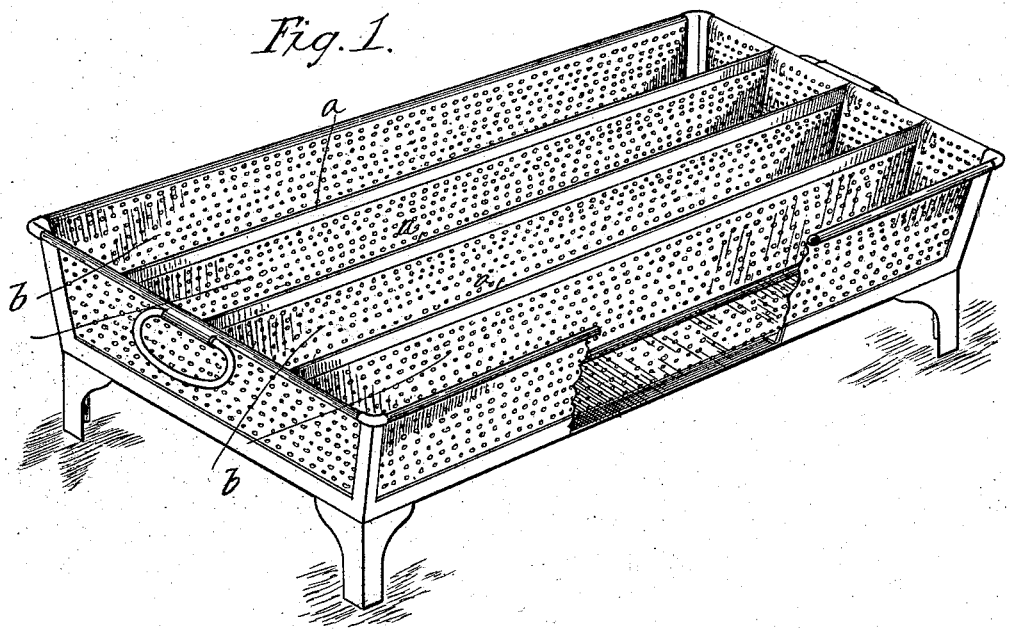
Figure 2:
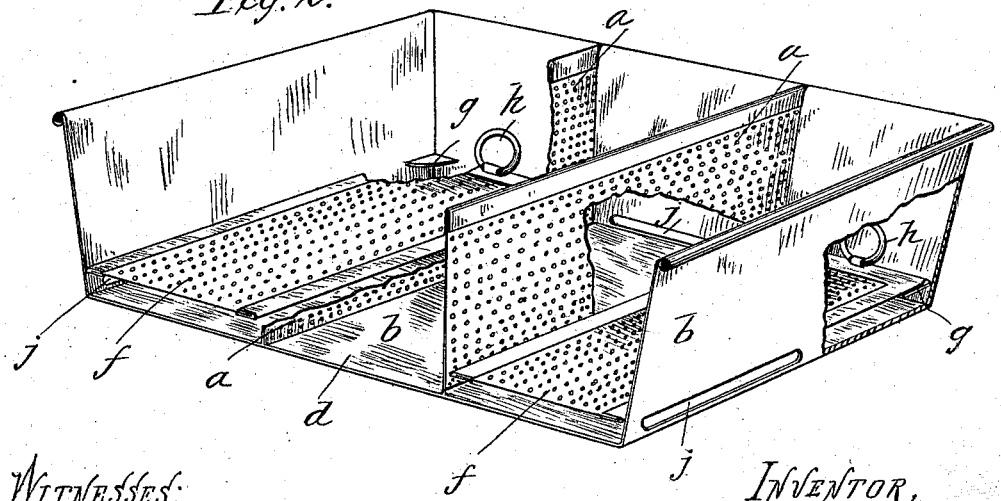

Figure 1 is a perspective view of a utensil which is susceptible of advantageous use in conjunction with the utensil which constitutes the subject matter of this invention, and which is represented in Fig. 2 which is a perspective and sectional view of the utensil last referred to.

In the drawings, in Fig. 2 the receptacle embodies a receptacle or pan of rectangular form with sides of suitable height, and having the longitudinal partitions, *a, a*, whereby the comparatively long and narrow compartments, *b*, are produced. In this utensil there is provided the permanent bottom, *d*, to the pan which is imperforate, and in each compartment the separate removable or false bottom, *f*, which is perforated,—its support at the slight distance above the bottom being upon the shelf-like lugs, *g, g*, provided therefor. Each removable bottom has at each end the ring, *h*, to facilitate its withdrawal from the receptacle, as required. The sides of the pan, a little way above the bottom, and yet below the perforated false bottoms, have the apertures, *j*, through them for the entrance of air under the perforated false bottoms.

The nut-cakes, &c., after being withdrawn from the kettle, are placed in the above described receptacle, preferably so as to rest upon the perforated false bottoms, and each to lean against the sides of the compartment, all whereby they may be drained, and all thereof standing separate from each other and subject to the circulation of air entirely about them, while the superfluous melted fat passes to the bottom of the receptacle.

The removable bottom sections may be taken out for the purpose of removing the accumulation of fat and for washing, or otherwise cleansing, the utensil.

The utensil shown in Fig. 1 is designed to serve as a final receptacle for the nut-cakes, the same consisting of the rectangular pan, or receptacle, having bottom, sides, and longitudinal partitions, all perforated.

The nut-cakes, after being withdrawn from the frying-kettle, will be advantageously first placed in the receptacle of Fig. 2, and drained and then arranged within the compartments of the other receptacle where they will, by being subjected to the action of the air, be brought to the most tempting appearance and least indigestible condition.

Having thus described my invention, what I claim, and desire to secure by Letters Patent, is—

A utensil of the character described, the same consisting of a rectangular receptacle having a permanent imperforate bottom and with sides having apertures through them near the bottom, and comprising therein one or more longitudinally ranging perforated partitions, and a removable perforated false bottom in each compartment, and means for supporting said removable perforated bottoms above the permanent bottom of the receptacle, and above said side apertures, substantially as described.

CYNTHIA E. R. MARSH.

Witnesses:
H. A. CHAPIN,
WM. S. BELLOWS.